Patented June 9, 1953

2,641,582

UNITED STATES PATENT OFFICE 2,641,582

REGENERATION OF A PLATINUM-CONTAINING CATALYST

Vladimir Haensel, Hinsdale, Ill., assignor to Universal Oil Products Company, Chicago, Ill., a corporation of Delaware No Drawing. Application October 3, 1950, Serial No. 188,279

2 Claims. (Cl. 252—416)

This invention relates to the reactivation of catalysts and more particularly to the reactivation of catalysts which have become carbonized during use.

The present invention is directed particularly to the reactivation of catalysts containing noble and/or rare metals including platinum, palladium, ruthenium, rhodium, osmium, iridium, gold, etc., or mixtures thereof. The novel features of the present invention are particularly adapted to the reactivation of platinum-containing catalysts and the following description will be directed particularly to the treatment of such catalysts, with the understanding that the process may be utilized for the reactivation of other catalysts as herein set forth but not necessarily with equivalent results.

Platinum-containing catalysts are utilized in a number of conversion reactions. During the course of the conversion reaction, carbonaceous materials become deposited on the catalysts and deactivate the catalyst activity for effecting the desired conversion. For example, a catalyst comprising alumina, from about 0.01% to about 1% by weight of platinum and from about 0.1% to about 8% by weight of halogen is particularly suitable for use in the reforming of gasoline. The term "reforming" is well known in the art and refers to the treatment of gasoline, naphtha, etc. in order to improve the anti-knock properties thereof. This catalyst may be used in the reforming process for a relatively long period of time without substantial loss of catalyst activity. For this reason, the process is generally considered as a non-regenerative process. However, after such long periods of time, the catalyst does become catalyzed and eventually requires reactivation.

In the reforming operation, various reactions occur including hydrocracking and, as a result of the cracking, the catalyst becomes coated with a carbonaceous deposit. When using this catalyst for reactions such as dehydrogenation, dehydrohalogenation, desulfurization, etc., best results are sometimes obtained when higher temperatures are utilized. When the higher temperatures are utilized, some cracking also takes place and, as a result of this cracking, the catalyst becomes coated with a carbonaceous deposit.

In accordance with the present invention the carbonized catalyst is treated in a two step process under separately controlled conditions in order to effect reactivation of the catalyst. The catalysts comprising noble and rare metals differ from other metal and metal oxide catalysts in several respects as will be set forth hereinafter, and require special methods of treatment for reactivation thereof.

In one embodiment the present invention relates to a method of reactivating a catalyst containing a noble and/or rare metal which comprises treating said catalyst with an oxygen-containing gas at a temperature of below about 800° F. and then at a temperature of above about 800° F.

In another embodiment the present invention relates to a method of reactivating a carbonized platinum-containing catalyst which comprises treating said catalyst with an oxygen-containing gas at a temperature of from about 500° to about 800° F. for at least 6 hours and then at a temperature of from about 800° to about 1000° F. for not more than 6 hours.

In a specific embodiment the present invention relates to a method of reactivating a carbonized catalyst comprising alumina, from about 0.01% to about 1% by weight of platinum and from about 0.1% to about 8% by weight of halogen, which comprises treating said catalyst with air at a temperature of from about 500° to about 700° F. for a period of from about 6 to about 30 hours and then at a temperature of from about 800° to about 1000° F. for a period of from about 1 to about 6 hours.

As hereinbefore set forth the reactivation of catalysts containing noble and/or rare metals requires special considerations which are not encountered when treating other metal or metal oxide catalysts. For example, platinum is very expensive and care must be exercised not to harm the platinum. When treated under oxidized conditions, platinum at high temperatures will undergo modification, including migration, transformation, etc., and may result in an inactive catalyst. The extreme care required in the treatment of platinum-containing catalysts is particulary emphasized in the treatment of catalyst used for reforming because of the very low concentrations of platinum in the catalyst. Furthermore, platinum acts as an oxidation promoter and therefore the platinum serves in the unique capacity of facilitating the removal of carbonaceous deposits in the burning operation.

In the past it has been general practice to reactivate carbonized catalysts by treating the same with an oxygen-containing gas at a temperature of from about 800° to about 1200° F. I have found that such a treatment of the platinum-containing catalyst does not restore the full activity of the catalyst. On the other hand I have found that a two step treatment, each step being under separately controlled conditions, will restore the full activity of the catalyst. The novel two step treatment is hereinafter set forth in detail.

In accordance with the present invention the carbonized catalyst is treated with an oxygen-containing gas and particularly air first at a temperature of below about 800° F. for at least 6 hours and then is treated at a temperature of above about 800° F. During the first or low temperature burning treatment, the burning operation is kept under careful control and serves to remove a substantial portion of the carbonaceous deposits from the catalyst. Because platinum serves as an oxidation promoter, substantial burning of the carbon from the catalyst is effected at the low temperature. Because the temperature is controlled below 800° F., the burning of the carbonaceous material is effected slowly and because of this, undesirable modifications of the platinum is avoided. As will be shown in the example, when this burning operation is effected at high temperatures, the resultant catalyst does not have the activity which is obtained by the two step treatment of the present invention.

The first or low temperature treatment of the catalyst is effected at a temperature below 800° F. and generally within the range of from about 500° to about 800° F. Still more preferably this step of the process is effected at a temperature of from about 500° to about 700° F. The time of treatment is at least 6 hours and still more particularly is within the range of from about 6 to 30 hours or more. It is understood that the temperature and time will be correlated to produce the desired results. The temperature and time are inversely related and, therefore, when employing higher temperatures within the range specified, shorter times will be used and, conversely, when employing lower temperatures, longer times will be used.

After the treatment at the low temperature, the catalyst requires further treatment at a higher temperature. Because a substantial portion of the carbonaceous material has been removed from the catalyst by the first stage treatment, the catalyst may be heated to a high temperature without harming the same. There generally will be only a small amount of carbonaceous material to be burned from the catalyst in this step of the process and this may be effected in the high temperature stage without harmful results to the catalyst. In fact the last traces of carbonaceous material on the catalyst are more difficult to remove and require the high temperature treatment for this purpose. Furthermore, it has been found that the catalyst requires the higher temperature treatment for another reason. Apparently during use in the conversion reaction and/or during the low temperature burning treatment a modification of the platinum does occur, and the higher temperature treatment serves to effect reorientation of the platinum. It is believed that this reorientation may include a change in the valency state of the platinum back to that existing in the fresh catalyst. However, it is understood that I do not intend to be limited to this explanation.

The high temperature treatment of the catalyst is effected at a temperature of above about 800° F. and generally of from about 800° to about 1000° F. This treatment preferably is effected for periods of time of from about one to about 6 hours. Here again, it is understood that the temperature and time will be correlated to produce the desired results and that higher temperatures will require shorter times and that lower temperatures will require longer times.

As hereinbefore set forth the novel features of the present invention are particularly adapted for the reactivation of platinum-containing catalysts and more particularly catalysts comprising alumina and platinum which had become carbonized during use in the reforming of gasoline.

During use in the reforming process and also in other processes, the catalyst may become coated with a scale of iron, iron oxide or other metallic or oxide constituents. In general it has been found that catalysts treated in the above manner may be used without removal of the metallic coating. However, it is within the scope of the present invention to remove the coating in any suitable manner such as by air blowing, attrition, agitation, etc. Upon removal of the coating, the catalyst particles are light in color and appear to be identical to the fresh catalyst. This color change may be used, when desired, as an indication of the time of treatment for the reactivation of the catalyst. For this purpose it may be preferred to remove the scale or coating from the catalyst prior to the reactivation treatment.

The catalyst may be in any suitable particle size for reactivation in accordance with the present invention. Usually the catalyst will be in preformed shapes of uniform size as produced by pelleting, extrusion or other suitable methods, and these particles may be treated in accordance with the present invention.

From the hereinbefore description it is apparent that the reactivation of platinum-containing catalysts requires special treatment. In accordance with the present invention a substantial proportion and preferably most of the carbonaceous material is burned from the catalyst at a controlled temperature which is sufficiently low to prevent harmful effect to the platinum. Advantage is taken of the property of the platinum to catalyze the oxidation of the carbonaceous material. Following the low temperature treatment, the catalyst is treated at a high temperature to burn further quantities of carbonaceous material but, because there is little carbonaceous material to be burned, no harmful effects result from the high temperature treatment. In addition the high temperature treatment serves to effect reorientation of the platinum. It is thus seen that the low temperature treatment and the high temperature treatment are mutually related in effecting the desired reactivation treatment.

The following example is introduced to further illustrate the novelty and utility of the present invention but not with the intention of unduly limiting the same.

The catalyst comprised alumina, 0.3% platinum and 0.3% fluorine. This catalyst had been used for the reforming of straight run naphtha and had become carbonized and had lost its activity beyond that satisfactory for further use.

A sample of the catalyst was subjected to reactivation by treatment with air at a temperature of 625° F. for 24 hours. The temperature was then raised to 932° F. and was maintained at this temperature for 2 hours. This reactivated catalyst is herein designated as catalyst A.

Another sample of the carbonized catalyst was treated with air at a temperature increased to 932° F. in 3 hours and maintained at 932° F.

for 3 hours. This catalyst is designated herein as catalyst B.

Both samples of the reactivated catalysts were tested for activity in a standard aromatization test in which naphtha of 200° to 400° F. boiling range is passed over the catalyst at a block temperature of 977° F., and a pressure of 300 pounds in the presence of hydrogen. The results of these tests are shown in the following table.

*Table I*

| Catalyst | Initial Specific Dispersion | Final Specific Dispersion | Initial Catalyst Temperature, °F. | Final Catalyst Temperature, °F. | Percent Carbon |
|---|---|---|---|---|---|
| Catalyst A | 142.0 | 134.4 | 855 | 892 | 4.52 |
| Catalyst B | 139.8 | 124.1 | 869 | 943 | 6.52 |

Referring to the data in the above table it will be noted that the specific dispersions with catalyst A (reactivated in accordance with the present invention) were higher both at the start and at the end of the test as compared to the specific dispersions for catalyst B. The specific dispersion is an indication of the dehydrogenation activity of the catalyst as a decrease in the specific dispersion shows that the activity of the catalyst for dehydrogenation has decreased. This is also shown by an increase in the catalyst temperature because the dehydrogenation reaction is endothermic and, as the endothermic reaction decreases, the catalyst temperature rises. It will be noted that both the initial and final catalyst temperatures with catalyst A are lower than the corresponding temperatures for catalyst B. Another advantage for catalyst A is that the percent of carbon formed is considerably less than that formed with catalyst B.

The aromatization test was continued for 18 hours. The initial determinations were made on the product collected during the first 3 hours and the final determinations were made on the product formed during the last 3 hours of the run.

I claim as my invention:

1. The method of reactivating a carbonized catalyst comprising alumina, from about 0.01% to about 1% by weight of platinum and from about 0.1% to about 8% by weight of halogen, which comprises treating said catalyst with air at a temperature of from about 500° to about 700° F. for a period of from about 6 to about 30 hours and then further treating the catalyst with air at a temperature of from 800° to 1000° F. for a period from about 1 to about 6 hours.

2. A method of reactivating a carbonized catalyst comprising alumina and platinum, which comprises treating said catalyst with an oxygen-containing gas at a temperature of from about 500° to about 700° F. for a period of from about 6 to about 30 hours and then further treating the catalyst with an oxygen-containing gas at a temperature of from 800° to 1000° F. for a period of from about 1 to about 6 hours.

VLADIMIR HAENSEL.

References Cited in the file of this patent

UNITED STATES PATENTS

| Number | Name | Date |
|---|---|---|
| 2,368,507 | Welty | Jan. 30, 1945 |
| 2,382,472 | Frey | Aug. 14, 1945 |
| 2,388,536 | Gunness | Nov. 6, 1945 |
| 2,406,172 | Smithells | Aug. 20, 1946 |
| 2,461,838 | Neuhart | Feb. 15, 1949 |
| 2,478,916 | Haensel et al. | Aug. 16, 1949 |

OTHER REFERENCES

Reasenberg et al.—Jour. Am. Chem. Soc., vol. 61, pp. 384–387, February 1939.